M. H. DEMENT.

METHOD OF PREPARING MATRIX FORMS FOR STEREOTYPING.

No. 10,385. Reissued Sept. 25, 1883.

Witnesses.

Will R. Cushundro

Columbus Smith.

Inventor.

Merritt H. Dement

THE NORRIS PETERS CO., WASHINGTON, D. C.

UNITED STATES PATENT OFFICE.

MERRITT H. DEMENT, OF CHICAGO, ILLINOIS.

METHOD OF PREPARING MATRIX-FORMS FOR STEREOTYPING.

SPECIFICATION forming part of Reissued Letters Patent No. 10,385, dated September 25, 1883.

Original No. 265,918, dated October 10, 1882. Application for reissue filed June 4, 1883.

*To all whom it may concern:*

Be it known that I, MERRITT H. DEMENT, a citizen of the United States, residing in the city of Chicago, county of Cook, and State of Illinois, have invented a new and useful Improvement in the Method of Preparing Type-Matrix Forms for Stereotyping; and I do hereby declare that the following is a full, clear, and exact description thereof, reference being had to the accompanying drawings, and to the letters of reference marked thereon, forming a part of this specification.

My invention relates to the arts of printing and stereotyping, but more particularly to matrix-forms composed of strips and pieces of strips of paper or other material in which type-indentations have been made.

The object of my invention is to fill up even or nearly even with the surface of the matrix side of the form all the spaces or open places therein, (excepting the type-indentations,) meaning the spaces between the ends of the pieces of strip forming lines, the spaces between the lines themselves, and the spaces at the ends of short lines, whereby the matrix from which the stereotype-plate is to be made shall be rendered perfectly free from spaces or open places, so that the stereotype-plate when made shall present no prominences which would print other than those made by the type-indentations. I accomplish this object by preparing a suitable fluid or plastic material, which, when hardened on exposure to heat or air, or otherwise, will be suitable for making stereotype-plates from, and forcing this material, while in a yielding condition, between the strips and pieces of strips, as aforesaid, so as to fill all unnecessary openings or spaces in the matrix-form, leaving no places, except the type-indentations in the strips themselves, where the molten stereotyping material could run in and thus form prominences on the plate. Such fluid or plastic material may be made from various substances—such as clay, pipe-clay, kaolin, plaster-of-paris, paper-pulp, and many others, or combinations of two or more of them, the essential points being to have a material which is or can be made fluid or plastic, which can be hardened, and from which a stereotype-plate can be made.

I do not mean to limit myself to any particular material or combination, nor to those above named, there being apparently many substances which will answer.

Figure 2:
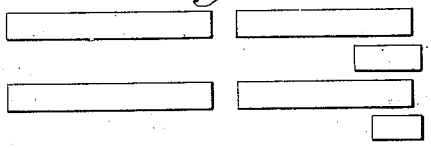

The material may be applied to the back of the form or to the face. To apply it to the back of the form, the form may be reversed and laid with the type-indentations down, upon a solid flat surface, the strips and pieces of strips being secured in place when necessary by using an adhesive substance upon the flat surface or upon a paper or cloth, and laying the latter under the form on the flat surface. Figure 2 represents the form thus inverted. The material may then be applied by spreading it evenly upon a holder (such as thick pasteboard or a thin board, the holder being allowed to remain to strengthen the matrix and make it capable of preservation) and laying the holder thus coated upon the back of the matrix, using any necessary pressure to force the material into all the spaces, so as to fill the same compactly; or the operation may be reversed by pressing the form into a layer of the filling material, the face of the form being first secured to a flat surface.

In applying the material to the face of the matrix-form a ribbed mold should be used, the ribs fitting securely over the lines of indentations and the material being poured or pressed in the openings between the ribs or lines. This process may cause ridges between the lines on the face of the matrix. The form when filled should be hardened by baking, exposure to air, or otherwise, according to the material used. The flat surface and paper (if paper be used) are removed, and the form is ready for stereotyping.

The essential features of my invention therefore consist in filling the spaces in the matrix-form between the strips and between and at the ends of strips in any suitable manner with a fluid plaster or other material, which may be caused by pressure, or otherwise, to readily and compactly fill such spaces, and which is then susceptible of being hardened, so that one or more stereotype-plates may be made from the form, it being important that the material should not be of such a nature that the molten stereotyping metal when poured on would melt or deform it. The matrix-form after it is finished should present a practically-smooth surface, excepting the type-indentations, all the spaces, as shown in Figs. 1 and 2, being filled by the material.

Figure 1:
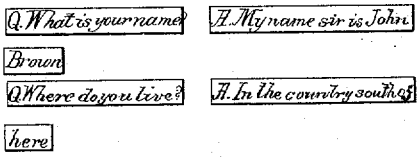
Figure 3:
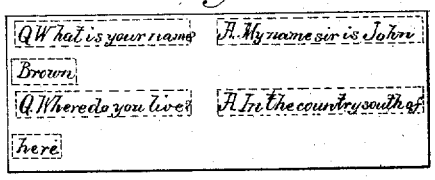

Referring to the drawings hereto annexed, Fig. 1 represents a portion of a page or column form, showing spaces. Fig. 2 represents the same reversed, so that the material may be applied to the back, the type-indentations being supposed to be underneath. Fig. 3 is a face view of the form as in Fig. 1 after the spaces have been filled with the material, the dotted lines representing the outlines of the strips as embedded in the material.

Having thus described my invention, what I claim as new, and desire to secure by Letters Patent, is—

1. The method of preparing a matrix-form composed of type-indented strips for stereotyping, which consists in securing said strips on a support and applying to the spaces between the strips a fluid or plastic material for filling said spaces, and allowing the same to harden, substantially as shown and described.

2. The method of preparing a matrix-form composed of type-indented strips for stereotyping, which consists in securing said strips on a support and applying to the spaces between and at the ends of said strips a fluid or plastic material for filling said spaces, and allowing the same to harden, substantially as shown and described.

3. The method of preparing a matrix-form composed of type-indented strips for stereotyping, which consists in securing said strips on a support and applying to the open spaces in said form a fluid or plastic material for filling said spaces, and allowing the same to harden, substantially as shown and described.

MERRITT H. DEMENT.

Witnesses:

J. CLAYTON YOUKER,

C. G. OSGOOD.